(12) United States Patent
Moncrief et al.

(10) Patent No.: US 6,179,122 B1
(45) Date of Patent: Jan. 30, 2001

(54) PROTECTIVE HOLDER FOR A PORTABLE ELECTRONIC DEVICE

(76) Inventors: Michael L. Moncrief, 125 Lodi Dr., Pearl, MS (US) 39208; Dorsey W. Maxwell, 751 Brookwood Cir., Brookhaven, MS (US) 39602-0849

(*) Notice: Under 35 U.S.C. 154(b), the term of this patent shall be extended for 0 days.

(21) Appl. No.: 09/437,730

(22) Filed: Nov. 10, 1999

Related U.S. Application Data

(60) Provisional application No. 60/107,967, filed on Nov. 12, 1998.

(51) Int. Cl.$^7$ .................................................. B65D 85/30
(52) U.S. Cl. .......................................... 206/320; 206/592
(58) Field of Search ................................... 206/305, 320, 206/576, 521, 523, 591, 592, 594, 588, 562, 563; 248/176.1, 188.2, 188.8; 211/26, 26.1; 364/705.01, 708.1

(56) References Cited

U.S. PATENT DOCUMENTS

| Re. 33,402 | * | 10/1990 | Thrush | 206/320 |
|---|---|---|---|---|
| Re. 33,970 | * | 6/1992 | Butler | 206/523 |
| 4,515,272 | * | 5/1985 | Newhouse | 206/592 |
| 4,837,590 | * | 6/1989 | Sprague | 206/320 |
| 5,607,054 | * | 3/1997 | Hollingsworth | 206/320 |
| 5,790,021 | * | 8/1998 | Mickel et al. | 206/320 |
| 5,835,344 | * | 11/1998 | Alexander | 206/320 |
| 5,872,702 | * | 2/1999 | Kopel | 206/305 |

* cited by examiner

Primary Examiner—Luan K. Bui

(74) Attorney, Agent, or Firm—Peter A. Borsari

(57) ABSTRACT

A protective holder for a portable electronic device, such as a personal computer, wireless telephone or communicator, hand-held game or the like, in the form of a lidless enclosure having a bottom member, a front wall, a rear wall and two side walls, the four walls extending upwardly from bottom member as a one-piece unitary structure, the top edges of the front wall, rear wall and two side walls extending inwardly to form a continuous retaining flange. The protective holder is constructed from a water-resistant, flexible and resilient material such that the enclosure fits snugly about the electronic device in order to provide protection from impact shock, spillage, and other hazards. The exterior surfaces of the front wall and rear wall are provided with a plurality of vertically extending ribs which join a plurality of bottom ribs extending across the bottom member in a continuous manner. The protective holder is manufactured to have particular dimensions to conform to a specific model and/or type of electronic device and is provided with various openings corresponding to the electronic connections equipped on the electronic device. As the protective holder is completely open across the top, the electronic device retained therein can be used without having to remove the holder therefrom. In addition, the holder can remain secured to the electronic device for storage. The bottom member of the holder is configured with rear foot members and preferably smaller front foot members such the holder slopes downwardly toward the front, thereby providing an ergonomically correct angle of the device retained therein. The incorporation of the foot members provides a high coefficient of friction to the bottom member, thereby creating a greater gripping ability to reduce slipping and sliding of the protective holder on the work surface.

26 Claims, 5 Drawing Sheets

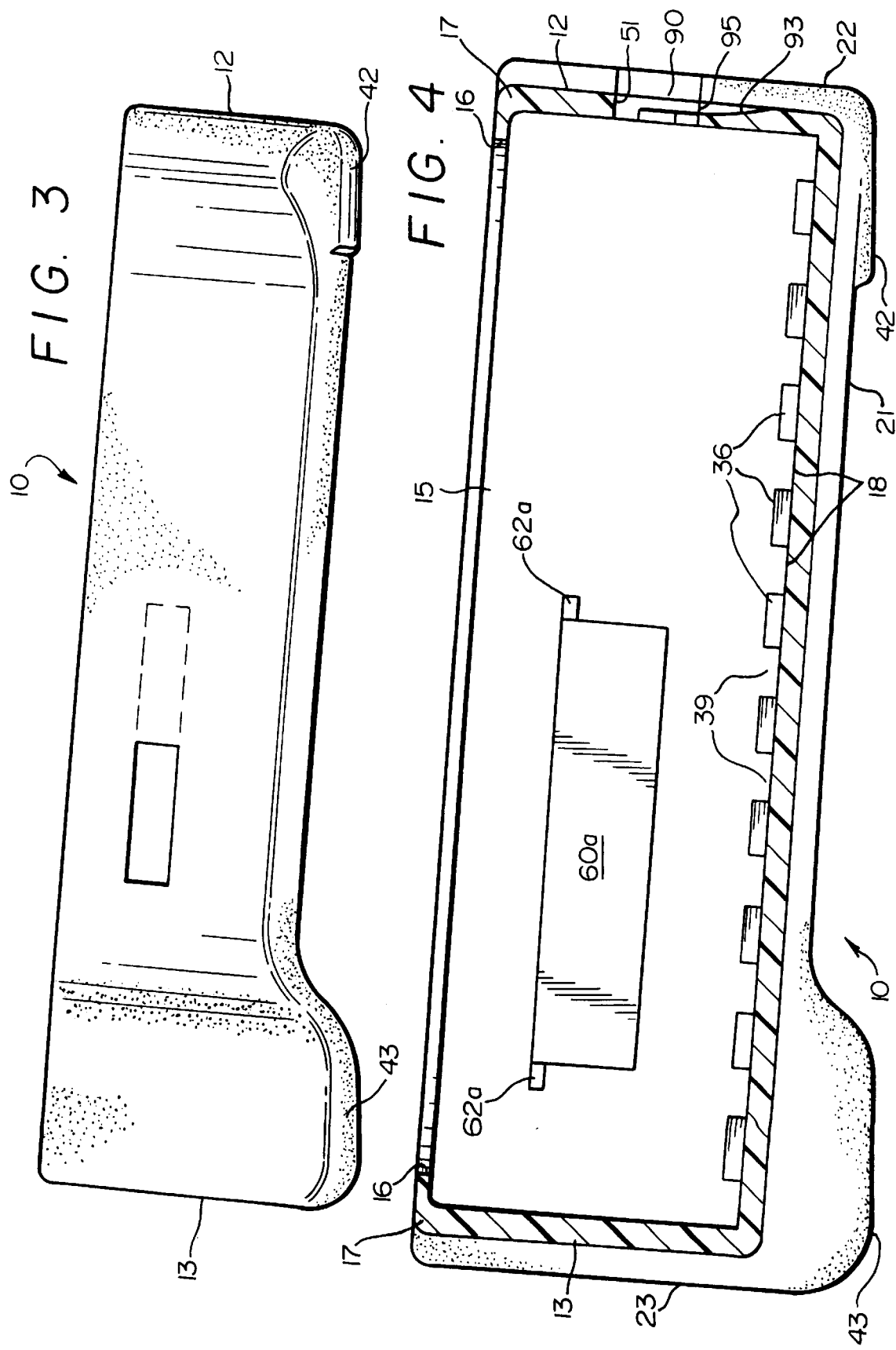

PROTECTIVE HOLDER FOR A PORTABLE ELECTRONIC DEVICE

RELATED APPLICATIONS

This application claims priority from U.S. Provisional Application 60/107,967, filed Nov. 12, 1998 in the name of Moncrief et al.

FIELD OF INVENTION

The present invention generally relates to cases, covers, and the like for protecting and storing various articles therein, and more specifically to a holder for securing and protecting an electronic device, such as a portable personal computer (i.e. laptop, notebook, hand-held personal computers, palm pilots et al.), wireless telephones and communicators, answering machines, hand-held games and the like. More particularly, the present invention provides a protective holder comprising a resilient container which closely conforms to the electronic device about the bottom and all sides while leaving the top of the electronic device with its data entry means (e.g. a keyboard) and screen exposed for use.

BACKGROUND OF THE INVENTION

Advances in electronics have led to the development of electronic devices which are sufficiently small, light weight, portable, and economical as to be carried and used virtually everywhere and in virtually any line of work or activity. Examples of such electronic devices include portable personal computers, wireless telephones and communicators, handheld games, and the like. Often times, these portable devices are used and exposed to relatively harsh operating environments, such as outdoor locales, industrial locations restaurants, automobiles, airplanes, and various trade shops, to name a few. While these portable electronic devices are designed to withstand normal wear and tear, they nevertheless are fragile when it comes to contamination by foreign matter, particularly liquids. Even at the most benign locations, such as the home or office, inadvertent and accidental spillage can often lead to damage to such electronic devices.

Electronic devices are susceptible to damage not only from their top surface (i.e. the data entry means or display portions, but also from their side and particularly bottom surfaces. For example, the spilling of a soft drink or other liquid on the same surface upon which the computer is resting, can allow the liquid to flow beneath the computer, whereupon it "wicks up" into the computer by capillary action, through the small crevices between access panels and through screw holes and such in the bottom of the machine.

Another disadvantage in using such relatively small and light weight computers is that their bottom surfaces generally are constructed from a smooth plastic material having a relatively low coefficient of friction. When a so-called "laptop" computer is used in the way its generic name implies, it can very easily slide from the lap of the user and fall and be damaged.

The prior art is replete with various cases and containers to protect portable computers and similar electronic devices while they are in storage and are not being used. However, there has been very little development with respect to the protection of such electronic devices, particularly a small laptop or palmtop type portable computer, while it is in use or at least while it is exposed on a flat work surface or the like.

U.S. Pat. No. 5,214,574 issued May 25, 1993 to Bo E. Chang, titled "Portable Computer Housing In Combination With A Portable Computer," describes a case having a hinged lid, with all components of the case being formed of a hard, rigid material, the case also providing storage for peripheral components, such as a printer. The Chang case differs substantially from the present invention in several respects. First, the protective holder of the present invention securely contains the electronic device (e.g. portable computer) as it is a unitary, monolithic device constructed from a flexible, resilient plastic material that fits closely about the electronic device. In addition, the present holder does not include a cover or lid to completely enclose a computer for storage when it is not in use, but rather protects the computer to a great extent when the computer is in use. Further, the protective holder of the present invention can remain on a portable computer and be placed in the Chang case for non-operational storage. Moreover, while the Chang case includes various passages for access to various ports on the computer, it does not provide any closure means for the passages, as may be provided with the present holder. Also, the rigid, hard bottom surface of the Chang case is not disclosed to provide any form of high friction, to reduce any tendency for the computer to slide from the lap or other work surface, whereas the high friction bottom surface of the present holder serves well to reduce such slippage. In addition, the protective holder of the present invention is designed to provide the user with a better ergonomical work angle.

U.S. Pat. No. 5,217,119 issued on Jun. 8, 1993 to Dale Hollingsworth, titled "Carrying Case For Laptop Computer," describes a generally rectangular case having rigid, hard walls with a suspension system therein for cradling a computer therein. The computer cannot be used operatively while contained within the Hollingsworth case. Thus, Hollingsworth provides only a storage device for a personal computer, rather than a protective holder for a portable computer while the computer is in use, as in the present invention.

U.S. Pat. No. 5,485,922 issued on Jan. 23, 1996 to Robert A. Butcher, titled "Portable Computer Carry Case Assembly," describes a case formed of hard, inflexible panels having a hinged lid and a single port or passage in the side of the case for connection of an external power cord to an integrally disposed power supply for the computer. Unlike the present invention, no other passages through the case are provided for access to disc drives, RS-232 ports, and/or for the connection of the computer to any other peripherals. In addition, the Butcher case is sufficiently solid and heavy as to be provided with luggage rollers or wheels, which is well beyond the scope and operational environment of the present holder.

U.S. Pat. No. 5,494,157 issued on Feb. 27, 1996 to Douglas J. Golenz et al., titled "Computer Bag With Side Accessible Padded Compartments," describes another carrying case having a rigid frame with additional flexible panels adapted to enclose a computer completely therein. Most significantly, the Golenz et al. case differs from the protective holder of the present invention because the computer must be removed completely from the case prior to its use.

U.S. Pat. No. 5,524,754 issued on Jun. 11, 1996 to W. Dale Hollingsworth, titled "Carrying Case For Notebook Computer," describes a rigid case having a resiliently suspended sling therein for holding a computer for transport and storage. The device is substantially similar to that of U.S. Pat. No. 5,217,119 discussed above and does not permit the computer to be operated while contained within the case, unlike the present holder.

U.S. Pat. No. 5,570,780 issued on Nov. 5, 1996 to Douglas C. Miller, titled "Portable Computer Carrying Case," describes a hard case having a plurality of inflatable bladders therein. When the computer is closed within the case, the bladders are somewhat pressurized to provide shock protection for the computer. The Miller case also differs from the present invention in that it does not permit operation of the computer while the computer is enclosed therein, as no access is provided when the case is completely closed.

U.S. Pat. No. 5,607,054 issued on Mar. 4, 1997 to W. Dale Hollingsworth, titled "Folio Carrying Case For A Notebook Computer," describes a case which completely encloses a computer for storage therein and which opens to provide operational access to the stored computer stored therein. While the Hollingsworth case does offer protuberances for supporting the rear of the computer at an angle for working, no high friction coefficient surface is provided to preclude slippage of the case upon a working surface (the foam pads of the protuberances face inwardly to cushion the sides of the computer when it is enclosed in the case, and do not provide any grip for the lower surface of the case) as does the protective holder of the present invention. In addition, the Hollingsworth case does not surround the computer on all sides nor does it provide any access passages for the computer peripherals (computer "mouse," disc access, etc.).

U.S. Pat. No. 5,632,373 issued on May 27, 1997 to Rajendra Kumar et al., titled "Protective Case For Portable Computer," discloses a case which appears to formed from a hard rigid material comprising a bottom portion with a closable lid therefor, a handle member which may be adjusted to lock the lid open relative to the opposite portion of the case, rubber bumpers at the corners of the bottom portion and access openings for computer disc slots, cable attachments, etc. Unlike the protective holder of the present invention, the Kumar et al. case does not provide any closure means for the openings in the lower portion of their case. Further, the present protective holder is formed entirely of a resilient plastic material, as a single, unitary component, with the exception of the closure means for the computer access openings. The use of such resilient material, in combination with ribs and/or rib feet formed on the underside, provide a high friction grip means not disclosed by Kumar et al.

U.S. Pat. No. 5,639,004 issued on Jun. 17, 1997 to Douglas D. Carlton et al., titled "Convertible Carrying Case and Work Platform For Small Electronic Devices," describes a tray-like device having shoulder straps and a flexible cover which may be rolled to provide a cushion between the user of a computer contained in the tray, and the tray itself. Unlike the protective holder of the present invention, the Carlton et al. case does not provide any access openings for the installation or removal of the computer discs, peripheral cables, etc., and as the Carlton et al. case is adapted to be supported about the neck and/or shoulders of the user, no high friction grip means is provided for the underside of the tray, whereas the present holder includes such high friction grip means.

U.S. Pat. No. 5,647,484 issued on Jul. 15, 1997 to Daniel J. Fleming, titled "Laptop Computer Encasement device Adapted For Printer," describes a closable case formed of hard, rigid panels for storing a small computer as well as a number of computer peripherals (printer, modem etc.) and is provided with passages for cables and the like. Unlike the protective holder of the present invention, the Fleming case does not provide a holder that fits snugly about a personable computer and which is constructed with access openings for computer discs and the like, nor is it provided with a bottom surface having a high coefficient of friction.

U.S. Pat. No. 5,666,265 issued on Sep. 9, 1997 to Ron E. Lutz et al., titled "Portable Workstation Housing," describes a computer enclosure formed of hard, rigid panels comprising a lid having side portions depending therefrom and a bottom portion with vertically extending sides when the lid is raised, in order to provide complete access to the computer. In contrast, the protective holder of the present invention encloses all sides and the bottom of the computer. Moreover, unlike the present invention, the Lutz et al. case does not include access openings for access to disc slots, peripheral cable ports, and the like, nor does it provide a bottom surface having a high coefficient of friction.

U.S. Pat. No. 5,682,993 issued on Nov. 4, 1997 to Kwang-ho Song, titled "Multipurpose Cover For A Notebook Personal Computer," describes a rectangular case which may be formed of a resilient material comprising access passages for cables and the like and closure means therefor. However, the Song cover differs from the present holder in that it comprises a complete enclosure having a cover which when the cover is opened, the computer is only partially enclosed. In contrast, the protective holder of the present invention is lidless, thereby providing access to the top of the computer at all times. In addition, the present protective holder comprises access openings for insertion of computer discs and the like. Further, while Song describes rubber bumpers or struts extending from the bottom of the case, they cannot provide a non-skid means for the device when it is resting upon the lap of a user, as "laptop" computers are intended to be used, by definition. The present protective holder provides a bottom surface having a high coefficient of friction which extends across substantially the entire lower surface of the holder, to provide extensive grip for the holder.

U.S. Pat. No. 5,725,090 issued on Mar. 10, 1998 to Scott Vermillion et al., titled "Carrying Case For Electronic Equipment," describes a case having a sling within the case, to support a computer. Unlike the protective holder of the present invention, the Vermillion et al. case does not allow a computer to be used while held therein. In addition, the Vermillion et al. case does not offer any openings for access to communication and cable ports, disc drive slots, etc., nor does it provide a high friction coefficient bottom surface.

U.S. Pat. No. Des. 312,534 issued on Dec. 4, 1990 to Michael D. Nelson et al., titled "Multimeter Holster," and U.S. Pat. No. Des. 325,471 issued on Apr. 21, 1992 to George L. McCain et al., titled "Multimeter Holster," both illustrate designs for a multimeter holster wherein a multimeter is enclosed about its four sides and bottom. However, neither holster provides openings along the sides for access to communication and cable ports, disc drive slots, and the like, not is either holster designed with an desirable ergonomical work angle.

U.S. Pat. No. Des. 337,435 issued on Jul. 20, 1993 to Steven T. Kaneko et al., titled "Multimeter Holster," illustrates another design similar to those of the Nelson et al. and McCain et al. designs discussed above. While an access opening is shown in one end of the design, but no closure means is illustrated for the opening, as provided in the present invention. Also, while finger grips are shown in the bottom surface of the design, no relatively deep rib feet are provided to serve as a high friction coefficient, nor is the holster designed having a desirable ergonomical work angle, as provided in the protective computer holder of the present invention.

U.S. Pat. No. Des. 344,074 issued on Feb. 8, 1994 to Steven M. Collins, titled "Combined Laptop Computer With Cellular Telephone And Carrying Case Therefor," illustrates an apparently hard and rigid case having a series of compartments therein, one of which is shown holding a computer. The case is much larger than the laptop computer illustrated therein, as opposed to the present holder which closely fits about the computer. The rigid, hard lid of the Collins case renders it unsuitable for laptop use, while the present holder is well adapted for such use, as well as the table or desktop use.

U.S. Pat. No. Des. 346,901 issued on May 17, 1994 to Peter G. Dulka et al., titled, "Laptop Computer Case," illustrates a case having a top and a bottom portion which may be secured together to enclose a computer completely therein. No access openings are shown in any of the views, nor is any non-skid surface indicated, as provided in the present invention.

U.S. Pat. No. Des. 360,978 issued on Aug. 8, 1995 to Bruce Willard et al., titled "Laptop Computer Case," illustrates a carrying bag having several different compartments therein. Unlike the protective holder of the present invention, the bag forms a complete enclosure about the computer, does not show any access openings, and does not appear to have a high friction coefficient surface.

U.S. Pat. No. Des. 361,657 issued on Aug. 29, 1995 to Carl J. Ledbetter et al., titled "Test Tool Holster," illustrates a device similar to the designs of the '534, '471, and '435 U.S. Design Patents respectively to Nelson et al., McCain et al., and Kaneko et al., discussed further above. The design illustrates an open top and one open end, as well as finger grip depressions in the lower surface thereof, but no relatively deep rib feet are provided in the lower surface to serve as grip means on an underlying surface, nor is the holder designed having a desirable ergonimical work angle, as provided by the protective holder of the present invention.

PCT Application No. WO 97/19006 published on May 29, 1997 to A. F. Akins, Inc., titled "Cover For A Laptop Or Notebook Computer," describes a multiple piece device formed of thin and flexible sheet material having no particular volumetric shape of its own which must be secured to the computer by additional attachment means (hook and loop material). In addition to the Akins cover being a multi-piece device, it does not include a high friction coefficient means for the bottom of the cover for the precluding slippage of the cover on an underlying surface, as opposed to the protective holder of the present invention.

Finally, PCT Application No. WO 97/34215 published on Sep. 18, 1997, titled "Holder For A Portable Computer, Especially A Laptop Or A Notebook," describes a case apparently formed of rigid, hard sheet material having elastomer corner supports for cushioning the computer and peripherals housed within the device and a laterally opening lid to provide complete closure of the computer therein. In contrast to the protective holder of the present invention, the case does not offer any lateral openings for accessing computer ports or disc drive slots is disclosed, nor is any high coefficient frictional surface apparent for the bottom of the case.

Despite the developments of the prior art, a need still exists for a protective holder for an electronic device which fits snugly about the bottom and side surfaces of the electronic device in such manner that the device is protected from any liquid spillage which may occur on the working surface, and also shielded from other damage, such as dirt, scratches etc. Such a protective holder also should have bottom surface configured with a higher rear base and which is characterized as being able to provide a high friction interface between the holder and the underlying lap or other working surface as well as offering an ergonomically desirable work angle. Additionally, such a protective holder should offer the option of openings for accessing cable ports, floppy disks and the like and should have means for quickly and conveniently closing such openings. Further, such a protective holder should be capable of being maintained about the electronic device while the electronic device is stored in a conventional carrying case.

SUMMARY OF THE INVENTION

Accordingly, it is an object of the present invention to provide a protective holder for a portable electronic device which completely and securely encloses all the sides and bottom of the electronic device and which has an open top to provide continuous access to the electronic device held therein.

It is another object of the present invention to provide a protective holder for an electronic device wherein the electronic device is a portable computer.

It is an additional object of the present invention to provide a protective holder for an electronic device which is molded or otherwise formed as a single, unitary component with the exception of any closure means, using a flexible and resilient plastic material.

It is a further object of the present invention to provide a protective holder having the option of at least one opening through one of the side walls thereof for access to peripheral electronic connections, such as cable and communication ports, disc drive slots, and like equipment typically utilized with a portable electronic device.

It is yet another object of the present invention to provide a protective holder having at least one opening with a convenient closure means for accessing electronic connections, such as cable and communication ports, disc drive slots, and like equipment typically utilized with a portable electronic device.

It is still another object of the present invention to provide a protective holder for an electronic device having a bottom surface configured with means to prevent the holder from slipping or sliding on the working surface.

It is an additional object of the present invention to provide a protective holder for an electronic device wherein the rear portion of the bottom surface is constructed in such a manner that the electronic device held therein is inclined towards the user.

It is yet a further object of the present invention to provide a protective holder for an electronic device having a plurality of support members extending along the interior surface of the bottom of the holder for further cushioning the electronic device, as well as providing a volume of space for air circulation and heat dissipation from the electronic device while it is in operation.

It is another object of the present invention to provide a protective holder for an electronic device having additional cushioning means at its side corners to protect an electronic device retained therein from shocks, shakes, bounces, bumps and other accidental jarring.

It is still another object of the present invention to provide a protective holder for an electronic device which is inexpensive to manufacture, sturdy in construction and easy to use.

Additional objects, advantages and novel features of the invention will be set forth in part of the description which follows, and in part will become readily apparent to those skilled in the art upon further examination of the following specification and drawings or may be learned by practice of the invention.

These and other objects of the present invention are accomplished by providing a protective holder for an electronic device, particularly a portable computer, comprising a bottom member and four side walls extending upwardly therefrom, the dimensions of the protective holder being configured in such a manner that an electronic device can be maintained securely within the holder. More particularly, the protective holder of the present invention is manufactured as single, unitary component, (save for any closure means) from a liquid-proof, flexible and resilient material such that an electronic device is held snugly therein. The holder can be configured with one or more openings disposed within one or more of its walls in order to permit access to the various electronic connections typically associated with a portable electronic device, such as peripheral communication ports, an electrical supply cord, a battery charge connector, a disc drive slot and the like. Preferably, each of the openings are provided with closure means, including for example, a hinged door, a snap fitting plate, a Velcro™ attachable cover, and similar closures, which may be closed when access to the particular electronic connection is not required. The dimensions of the protective holder, as well as the access openings, are configured specifically for the particular model or type of electronic device to be held therein.

The interior surface or floor of the bottom member of the protective holder can further comprise a plurality of raised support members thereon to raise the bottom of the electronic device above the floor of the protective holder, thereby rendering additional cushioning for the electronic device contained within the protective holder, as well as providing a volume of space for air circulation and heat dissipation from the computer while it is in operation.

The exterior surface of the bottom member can be configured with a plurality of ribs extending from front wall to back wall. Preferably, these ribs also extend vertically up the front and rear side walls of the protective holder. Some or all of the ribs may be constructed with small feet at the bottom end of the front wall and larger feet at the bottom end of the rear wall, thereby sloping the bottom surface of the holder (and the electronic device held therein) downwardly from rear to front. Such a design offers the user a more desirable ergonomic angle when the protective holder of the present invention is placed upon a flat working surface and also serves to protect the electronic device from any liquid spillage on the working surface. In addition, the rib-configured bottom exterior surface and in particular the front and rear feet, also provides a high coefficient of friction gripping surface to preclude the protective holder from slipping or sliding upon the working surface, as well as provide additional cushioning from shocks, shakes, bounces, bumps and other jarring.

BRIEF DESCRIPTION OF THE DRAWINGS

The present invention will be better understood with reference to the appended drawing sheets, wherein:

FIG. 3 is a side perspective view of the protective holder of the present invention showing the rear and front foot members.

FIG. 4 is a right side elevation in section of the protective holder of the present invention showing further internal details.

DETAILED DESCRIPTION

The present invention relates to a protective holder for a portable electronic device, examples of which include a portable personal computer, such as a laptop, notebook or palmtop computer, wireless telephones and communicators, answering machines, hand-held electronic games and the like. Hereinafter, this specification will describe the use of protective holder of the present invention for a portable personal computer. However, it is to be understood that limiting the description to a portable personal computer is merely to facilitate discussion of the present invention and that any portable electronic device can be retained within the protective holder without departing from the spirit of this invention.

Figure 1:
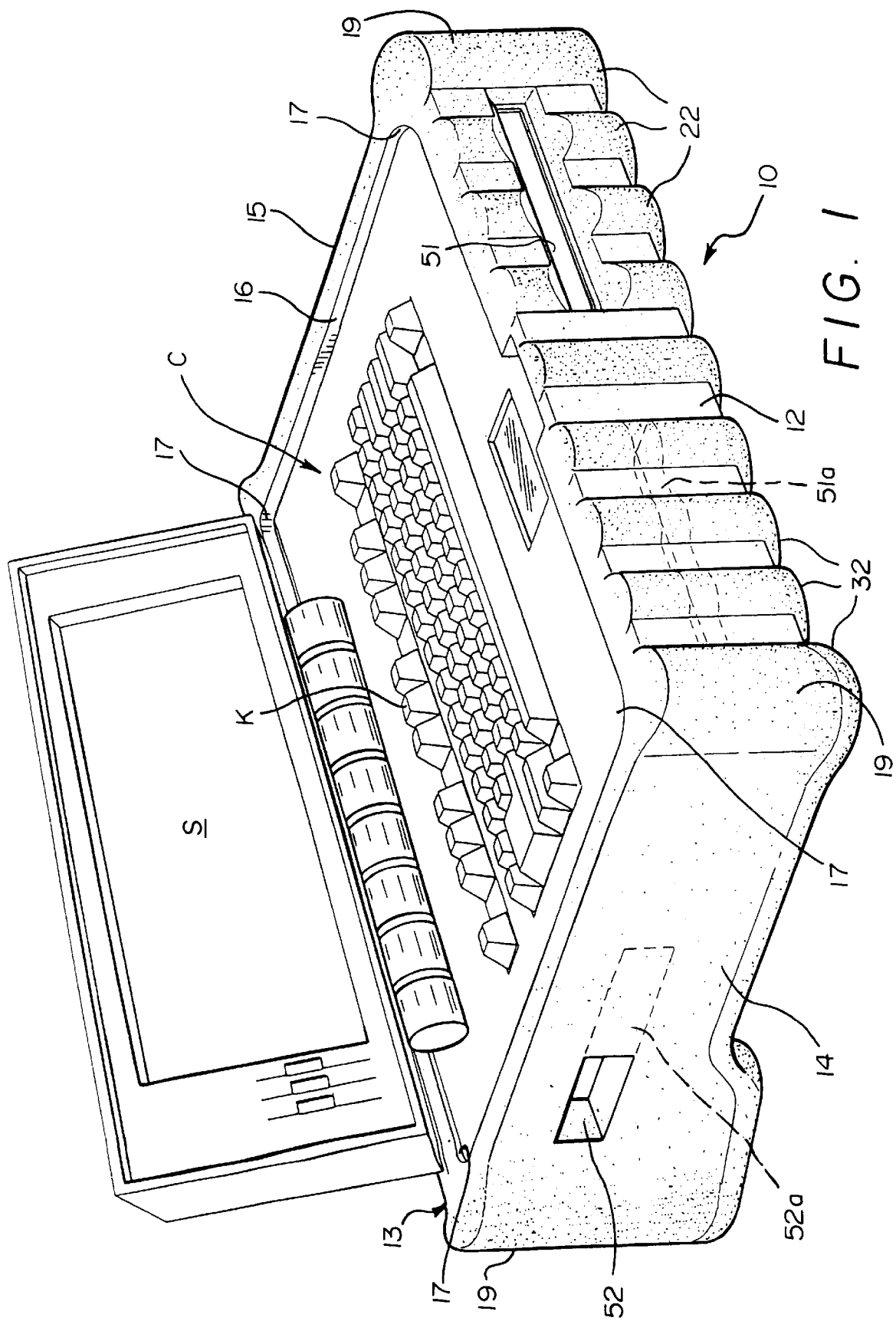
FIG. 1 is a top and front perspective view of the protective holder of the present invention having a portable computer held therein.

FIG. 1 shows a perspective view of the protective holder 10 of the present invention having a portable computer C snugly secured therein, the computer C having a keyboard K, foldable display screen S, and one or more electronic connections such as peripheral communication ports, cable connections and disc drive slots. Of course, it is to be understood that the keyboard can be any other type of data entry means, such as, for example, touch entry or voice entry, and that the display screen can be fixed upright rather than being foldable or can be built directly into the face of the portable electronic device.

Figure 2:
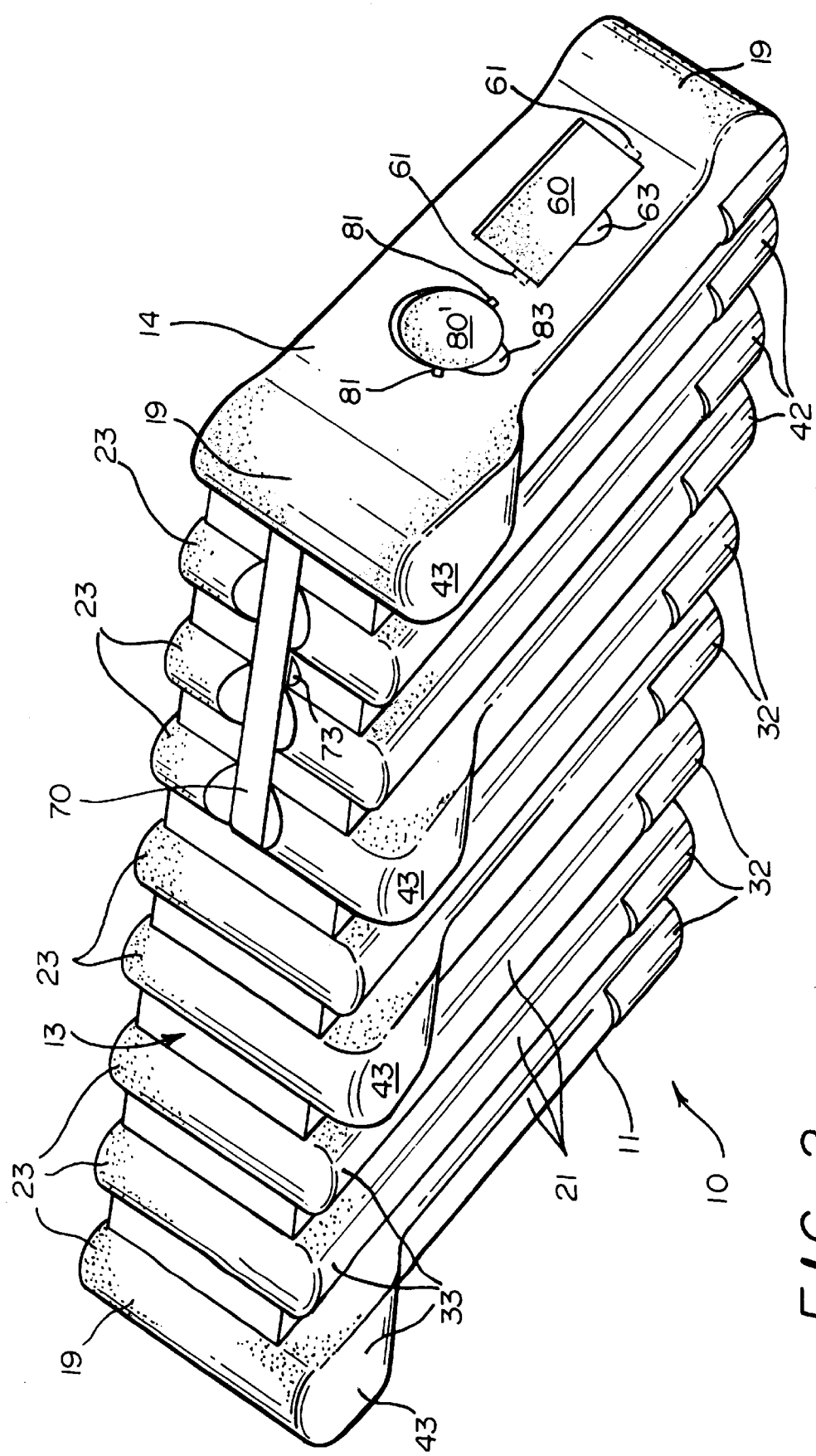
FIG. 2 is a bottom and rear perspective view of the protective holder of the present invention showing external details including the bottom surface ribs and rib feet.

As shown in FIGS. 1 and 2, the protective holder 10 generally comprises a bottom member 11 having a front wall 12, an opposite rear wall 13, a first or left side wall 14 and a second or right side wall 15, the four walls 12, 13, 14, and 15 extending upwardly from bottom member 11 and constructed as a single, continuous unit. Any flexible and resilient material is suitable for use in the construction the protective holder 10. Preferably, the material is flexible and resilient plastic material capable of being molded such that it can be dimensioned to fit snugly about a computer and further characterized as being resistant to moisture and liquids. More preferably, the material also is characterized as having a relatively high coefficient of friction in order to provide the surface of the protective holder with good gripping ability and to prevent the slipping or sliding on a work surface.

The upper edges of the continuous walls 12 through 15 are configured with an inwardly turned retaining flange 16 in order to further secure and retain the computer C within protective holder 10. Additional securing and retention means for the computer C can be provided by the extension of retaining flange 16 into each of the corners 17, thereby forming arc corners as shown in FIG. 1. This design of the protective holder 10 offers an open and lidless top, thereby exposing and allowing access to the keyboard K and screen S of the computer C otherwise enclosed within the holder 10. The dimensions of the bottom member 11 and walls 12 through 15 are configured specifically to correspond to a particular computer in order to provide a snug and close fit. In other words, the protective holder of the present invention can be manufactured in a variety of shapes and sizes to fit closely about various specific makes and models of portable computers. Such specific manufacturing, along with the use of a flexible and resilient material having a high coefficient of friction as well as the incorporation of a retaining flange, enables the present protective holder to provide a snug fit about the computer and securely retain the computer therein.

The exterior surfaces of the bottom member 11, front wall 12 and rear wall 13 are provided with a plurality of continuous ribs, preferably smoothly rounded continuous ribs, extending thereacross, specifically bottom ribs 21, front ribs 22 and rear ribs 23. The front and rear ribs 22 and 23 are vertically disposed over the respective front and rear walls 12 and 13 of the protective holder 10, with the bottom ribs 21 joining the front and rear ribs 22 and 23 to form a continuous, unbroken pattern wrapping about the front, bottom, and rear of the protective holder 10. The continuous ribs 21, 22 and 23 are formed integrally with the protective holder 10 in the manufacturing or injection molding process and are formed of the same material. As shown in particular in FIG. 1, each corner wall 19 is dimensioned with at thickness greater than the thickness of the side walls 14 and 15 in order to provide additional cushioning means for the protective holder 10.

The protective holder 10 can be constructed such that the bottom end 33 of rear wall 13 is raised relative to the bottom end 32 of front wall 12. Such a configuration provides a forward and downward slope of the protective holder 10, thereby offering a user with an ergonomically correct angle for the computer C and particularly its keyboard K. In order to obtain such a construction, at least two of the plurality of the bottom ribs 21 can be provided with a foot member 43 at the bottom end 33 of the rear wall 13. Preferably, four of the bottom ribs at the bottom end 33 each are provided with a foot member 43 and more preferably, the two outermost ribs and two of the inner ribs each are provided with a foot member 43. Preferably, at least two of the plurality of the bottom ribs 21 at the bottom end 32 of front wall 12 are provided with a foot member 42 which is smaller than foot 43. More preferably, all of the bottom ribs 21 at bottom end 32 are provided with a foot member 42.

Portable laptop and palmtop computers, such as the computer C shown in FIG. 1 typically are equipped with various electronic connections examples of which include communication ports for connection of printer, modem and electrical supply cables and slots for disc drives, modems and the like and will hereinafter be collectively referred to as electronic connections. These electronic connections usually are located through the front, rear, and/or side walls of the computer. In order to accommodate and provide access to these electronic connections, the protective holder of the present invention can be formed with openings corresponding to these electronic connections. More particularly, walls 12 through 15 can be configured with openings corresponding to specific models and types of computers.

Referring particularly to FIG. 1, a slot opening 51 is formed through the right side of the front wall 12 of the protective holder 10, thereby providing access for the insertion and removal of a disc into or from the computer C. An alternative slot opening 51a is shown to the left side of the front wall 12, for alternative computer configurations. An additional opening 52 is shown through the left sidewall 14, with an alternative enlarged portion 52a being shown in broken lines, again for alternative computer configurations. It will be obvious that various openings for different purposes may be disposed in virtually any locations about the walls 12, 13, 14 and 15 of protective holder 10 corresponding to the specific type of computer for which a given holder 10 is configured.

Figure 5:
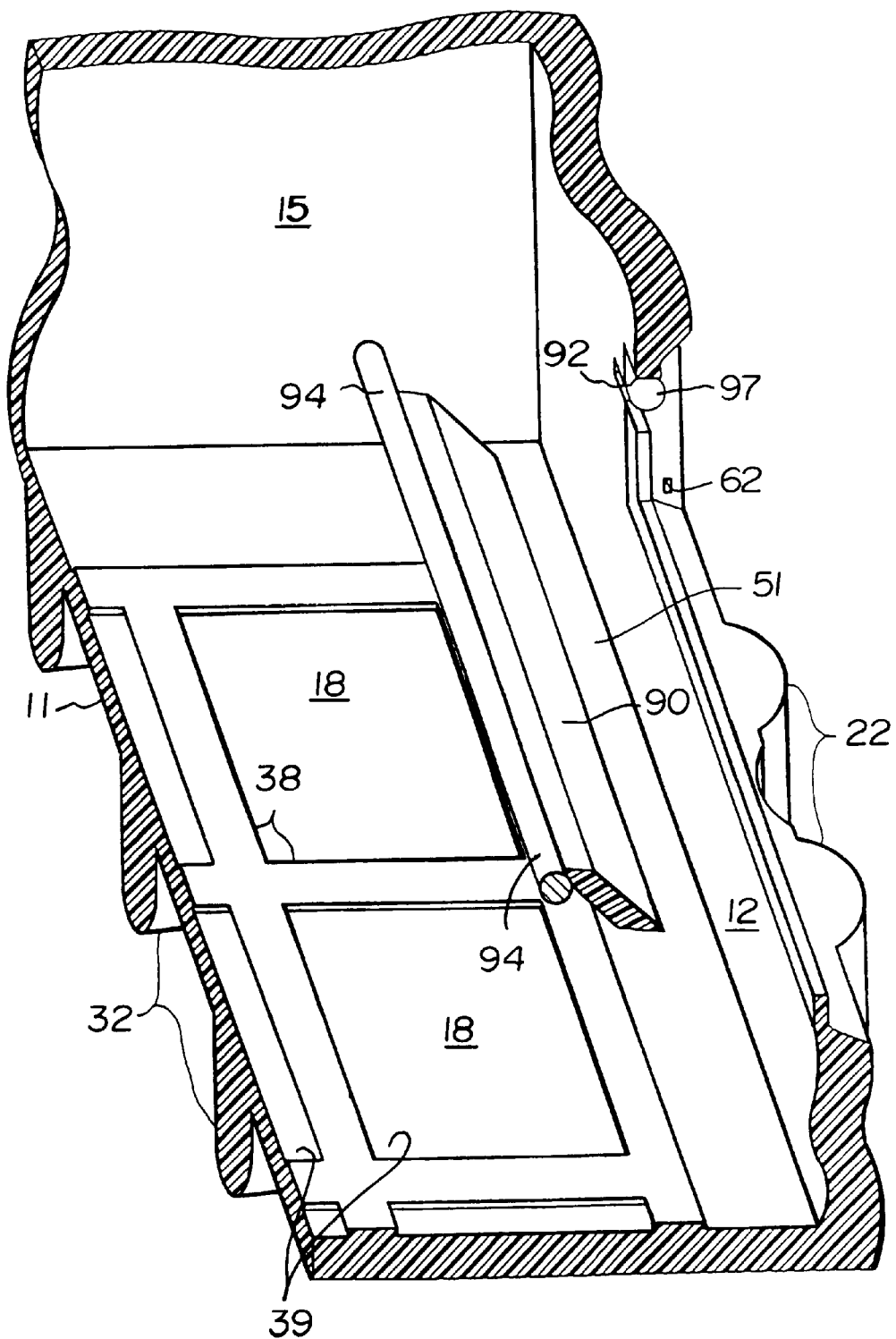
FIG. 5 is a broken away perspective view of the protective holder of the present invention, showing details of a closure in the form of a hinged door.

Although the openings 51 and 52 are shown in FIG. 1 to be exposed, with no closure means, the protective holder 10 preferably comprises some form of openable and sealable closure means for each of the openings in order to close and seal the openings when not in use. Closure means are well known in the art, suitable examples of which include hinged doors, snap-fitted plates and detachable closures formed from conventional hook and loop type fasteners (e.g. Velcro™). One type of closure means contemplated by the present invention, as shown in FIG. 2, is in the form of a hinged door 60 installed in an opening (not shown) in the left side wall 14 of protective holder 10; a second door 70 being shown in the rear wall 13. The doors preferably are configured to fit flush with the exterior surface of the wall in which they are disposed when the doors are closed. Thus, door 60 is configured to fit flush with the exterior surface of the side wall 14. One manner in which to accomplish a flush design is to provide a pair of protruding tabs 61 (shown in broken lines for the door 60) which are configured to engage a pair of mating locking slots 62 disposed in the side walls of the opening, as shown in FIG. 5, in order to secure the doors flush in their closed position. An access depression or a finger slot 63, 73 may be formed in the exterior surface of the side wall adjacent the edges of doors 60 and 70 respectively, opposite the door's hinge lines, for access to the edge of the door, thereby facilitating opening of the door. Another type of door, in the form of a generally circular door 80 may be provided in the side wall 14 as shown in FIG. 2 and also have an access depression or finger slot 83 and a pair of protruding tabs 81 in order to secure the circular door flush in its closed position.

Figure 6:
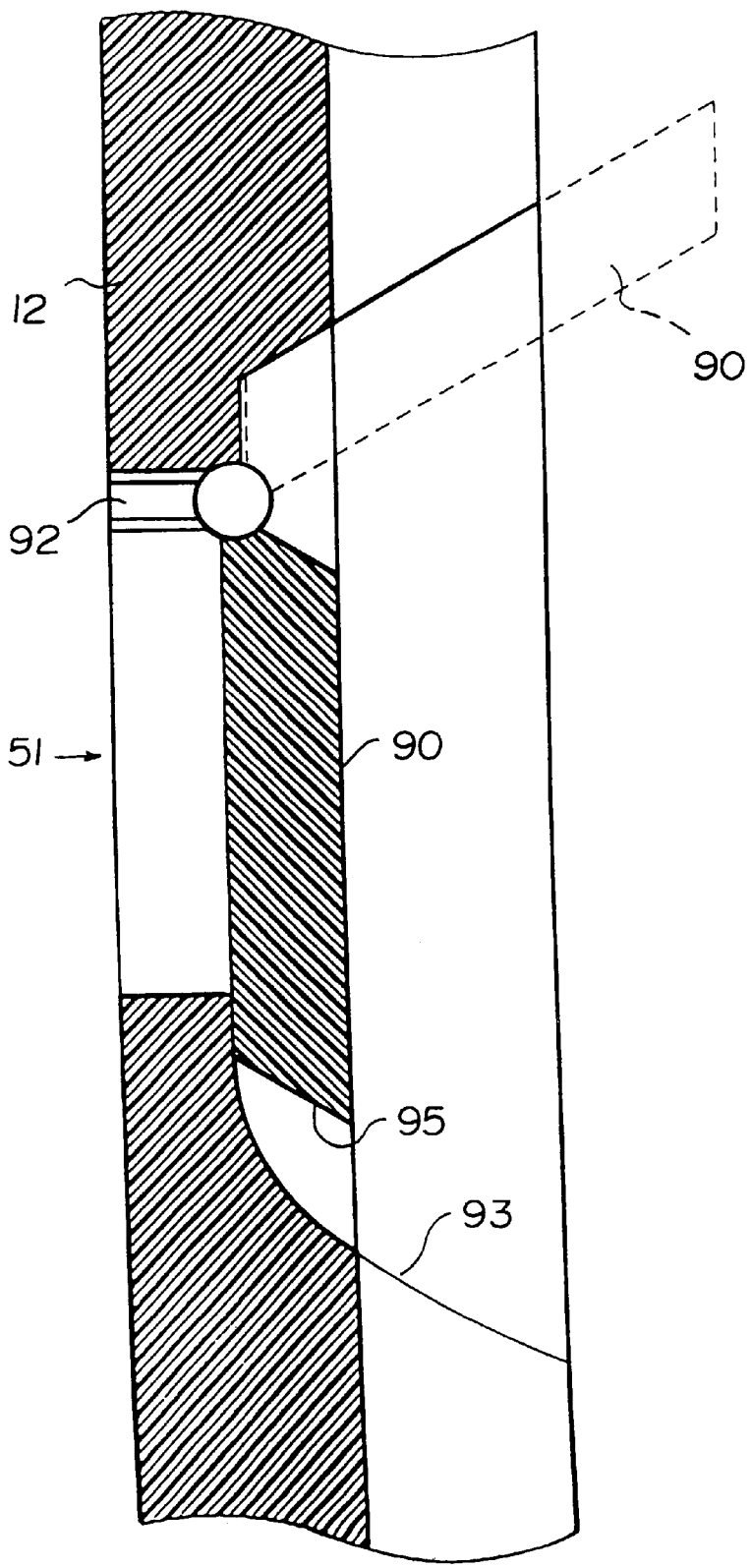
FIG. 6 is an enlarged scale, sectional view of the protective holder of the present invention illustrating structural details of a hinged door.

FIG. 4 illustrates an interior view of door 60a formed in the right side wall 15 of holder 10, the hinge slots 62a in side wall 15 being visible. FIG. 4 also shows a cross section view of a front panel door 90 disposed within disk slot opening 51 through the front wall 12 of protective holder 10. In FIG. 6, an enlarged scale view of door 90 is shown. The finger slot (or access depression) 93 is clearly visible in these views, as well as a small undercut lip 95 formed in the edge of the door 90 to facilitate opening the door. FIG. 5 provides a broken away perspective view of the front wall 12, right side wall 15, and the interior surface of bottom member 11, hereinafter referred to as floor 18 of the protective holder 10, showing additional details relating to the installation and structure of a door 90 which may be installed within a disc slot opening 51 (or other opening) through one or more of the walls of the holder 10. Preferably, the doors formed through the walls of the protective holder 10, are provided with a pair of opposed hinge pins 94, as shown in FIG. 5. Each of the corresponding openings, e.g. opening 51 of FIGS. 4 and 5, is provided with a pair of opposed hinge slots 92, each slot having a central cylindrical hinge pin retaining portion 97 which is configured to fit closely about the corresponding hinge pin 94, with a narrower slot extending between the central portion 97 and the inner surface of the corresponding wall, thus defining a generally "keyhole" shaped passage in cross section. Due to the resiliency of the material from which the protective holder 10 is formed, the relatively narrow slot between the inner surface of the wall and the cylindrical hinge pin retaining portion 97 is distensible to allow the hinge pin 94 to be pressed into place into the hinge pin retaining portion to secure the door (e.g. door 90 in FIGS. 4, 5 and 6) within the wall. In this manner, the door pivots about the captured hinge pins to provide a closable access to the corresponding computer slot or port thereunder. Each of the doors are latched or locked into place by means of protruding tabs, such as the protruding tabs 61 shown in FIG. 2 which resiliently engage the pair of locking slots, such as locking slots 62 shown in FIG. 5.

Preferably, a computer C held within the protective holder 10 is retained slightly above the interior surface or floor 18 in order to provide a somewhat greater shock absorptive space between the computer and the outside of the holder, as well as to provide some volume of space for air circulation and for heat dissipation from the computer while it is in operation. In addition, raising the computer above the floor offers extra protection in the event that a liquid or other foreign substance is spilled within the holder 10. FIGS. 4 and 5 illustrate means for raising and retaining the computer C above the floor 18 of the protective holder 10.

Referring to the cross section view of FIG. 4, a series of individual support members 36 are shown rising from the floor 18 of the protective holder 10. These support members 36 may be formed in any shaped, such as rounded or rectangular and may be regularly or irregularly spaced about the floor of the holder. The shape, size, number and positioning of the support members 36 is variable, as long as they serve to raise the computer off of the floor and form suitable spaced areas 39 therebetween to provide adequate air circulation and a volume of space for heat dissipation. For example, FIG. 5 illustrates a variation on such support members, showing a series of continuous support members 38 with corresponding spaced areas 39 therebetween. The continuous support members 38 of FIG. 5 serve the same purpose and function as do the support members 36 of FIG. 4, and may be formed as regularly or irregularly spaced straight or curved lines, or other shapes.

In summary, the protective holder of the present invention provides a secure means of retaining and protecting a portable electronic device, such as a laptop or palmtop computer, while simultaneously providing complete access to the data entry mean, e.g. keyboard, and display screen for operation of the computer. The use of a flexible, resilient and waterproof material in the construction of the protective holder functions not only to protect the computer housed therein from dirt, scratches, foreign matter, liquid spills and other damage, but also serves to cushion the computer from physical shock from inadvertent impact or the like. The protective holder is not particularly thick, the walls being constructed at about one eighth of an inch (⅛"), with some additional thickness provided by the ribs and at the side corner walls. The material and construction enables the protective holder to remain secured about the computer while the computer is stored in a carrying case or the like for transport or storage.

The ribs disposed on the front and rear walls and bottom members, along with the front and rear rib feet and thicker side corner walls of the protective holder provide additional shock absorbency by means of their additional thickness, with the front and rear rib feet providing a relatively high coefficient of friction serving to preclude slippage of the holder and computer contained therein, from a working surface. The forward and downward slope of the bottom member and floor of the holder allows the holder and computer therein to be positioned at an ergonomically appropriate angle for the user thereof. The bottom ribs and/or feet also function to raise the computer above the working surface, thereby providing further protection from spills on the working surface which might otherwise enter and damage the computer. In a like manner, the closure means in the form of doors over the various openings in the walls of the holder, provide further protection against the entry of foreign matter or liquids into the holder while the doors are closed when access to the computer port or slot thereunder is not required.

When use of the computer is required, the computer with the inventive protective holder thereabout can be removed quickly and easily from the storage case and used with the holder in place around the sides and bottom of the computer. The various openings in the walls of the holder and their corresponding doors facilitate connection of any peripherals (external power supplies, computer "mouse," etc.) required to operate the computer. When use of the computer is no longer required, the peripherals are disconnected, the doors are fixed into a closed position, and the computer is returned to its storage case until further use is desired. Accordingly, the protective holder of the present invention will be seen to provide an inexpensive and convenient means of providing further protection for a personal computer while the computer is in use, which operational protection was not heretofore available. The present holder will prove to be highly desirable accessory for those who use personal computers, particularly in relatively rough or hostile environments.

While particular embodiments of the invention have been described, it will be understood, of course, that the invention is not limited thereto, and that many obvious modifications, designs and variations can be made, and that such modifications, designs and variations are intended to fall within the scope of the appended claims.

What is claimed is:

1. A protective holder for a portable electronic device in the form of a lidless enclosure, comprising:

(a) a bottom member, a front wall, an opposite rear wall, a first side wall, and an opposite second side wall, said front wall, rear wall and first and second side walls extending upwardly from said bottom member and constructed as a single, one-piece unit, each of said front wall, said rear wall and said first and second side walls having a bottom end and a top end;

(b) a plurality of ribs, each of said ribs extending continuously and externally from said front wall to said rear wall and across said bottom member; and (c) at least two rear foot members disposed on said plurality of ribs at said bottom end of said rear wall in such a manner that said enclosure has a downward slope from said rear wall to said front wall when said enclosure is placed on a level surface, wherein said protective holder is constructed from a flexible and resilient plastic material.

2. The protective holder in accordance with claim 1, further comprising at least one opening disposed in one of said front wall, said rear wall and said first and second side walls.

3. The protective holder in accordance with claim 2, further comprising a closure means for covering said at least one opening.

4. The protective holder in accordance with claim 3, wherein the wall in which said at least one opening is disposed is provided with a pair of locking slots disposed on either side of said opening and wherein said closure means is provided with a pair of protruding tabs which are configured to engage said pair of locking slots in such a manner that said closure means can be secured flush to the wall in which said at least one opening is disposed.

5. The protective holder in accordance with claim 3, wherein said closure means is provided with a hinge pin and wherein the wall in which said at least one opening is disposed is provided with a hinge pin retaining slots corresponding to said hinge pin of said closure means, such that said closure means can be opened and closed about said hinge pin.

6. The protective holder in accordance with claim 1, further comprising at least two front foot members disposed on said bottom end of said front wall, said front foot members being smaller than said rear foot members, such that said enclosure has a downward slope from said rear wall to said front wall when said enclosure is placed on a level surface.

7. The protective holder in accordance with claim 6, wherein said at least two front foot members are disposed upon said plurality of ribs.

8. The protective holder in accordance with claim 7, wherein said at least two front foot members is a plurality of front foot members corresponding to said plurality of ribs, such that each of said plurality of ribs has a front foot member disposed thereon.

9. The protective holder in accordance with claim 1, wherein said top end of said front wall, rear wall and first and second side walls is provided with a continuous, inwardly turning retaining flange.

10. The protective holder in accordance with claim 9, wherein a first corner is formed where said front wall meets said first side wall, and a second corner is formed where said front wall meets said second side wall, and wherein at each of said first and second corners, said inwardly turning retaining flange is extended to form an arc.

11. The protective holder in accordance with claim 10, wherein a third corner is formed where said rear wall meets said first side wall, and a fourth corner is formed where said rear wall meets said second side wall, and wherein at each of said third and fourth corners, said inwardly turning retaining flange is extended to form an arc.

12. The protective holder in accordance with claim 1, wherein said bottom member has an interior surface comprising a floor and wherein a plurality of support members are disposed on said floor, said support members being capable of raising an electronic device resting thereon above the surface of said floor.

13. The protective holder in accordance with claim 1, further comprising four corner walls, each of said corner walls having a thickness greater than the thickness of said first and second side walls.

14. A portable electronic device and protective holder therefor, comprising in combination:
   (a) a portable electronic device having a data entry means and at least one electronic connection;
   (b) a protective holder for retaining said portable electronic device therein comprising a lidless enclosure comprising a bottom member, a front wall, an opposite rear wall, a first side wall, and an opposite second side wall, said front wall, rear wall and first and second side walls extending upwardly from said bottom member and constructed as a single, one-piece unit, each of said front wall, said rear wall and said first and second side walls having a bottom end and a top end;
   (c) a plurality of ribs, each of said extending continuously and externally from said front wall to said rear wall and across said bottom member; and
   (d) at least two rear foot members disposed on said plurality of ribs at said bottom end of said rear wall in such a manner that said enclosure has a downward slope from said rear wall to said front wall when said enclosure is placed on a level surface,
wherein said protective holder is constructed from a flexible and resilient plastic material and configured in such a manner that said front wall, said rear wall and said first and second side walls fit snugly about said portable electronic device retained therein.

15. The protective holder in accordance with claim 14, further comprising at least one opening disposed in one of said front wall, said rear wall and said first and second side walls, said at least one opening being configured to provide access to said electronic connection of said electronic device retained therein.

16. The protective holder in accordance with claim 15, further comprising a closure means for covering said at least one opening.

17. The protective holder in accordance with claim 16, wherein the wall in which said at least one opening is disposed is provided with a pair of locking slots disposed on either side of said opening and wherein said closure means is provided with a pair of protruding tabs which are configured to engage said pair of locking slots in such a manner that said closure means can be secured flush to the wall in which said at least one opening is disposed.

18. The protective holder in accordance with claim 16, wherein said closure means is provided with a hinge pin and wherein the wall in which said at least one opening is disposed is provided with a hinge pin retaining slots corresponding to said hinge pin of said closure means, such that said closure means can be opened and closed about said hinge pin.

19. The protective holder in accordance with claim 14, further comprising at least two front foot members disposed on said bottom end of said front wall, said front foot members being smaller than said rear foot members, such that said enclosure has a downward slope from said rear wall to said front wall when said enclosure is placed on a level surface.

20. The protective holder in accordance with claim 19, wherein said at least two front foot members are disposed upon said plurality of ribs.

21. The protective holder in accordance with claim 19, wherein said at least two front foot members is a plurality of front foot members corresponding to said plurality of ribs, such that each of said plurality of ribs has a front foot member disposed thereon.

22. The protective holder in accordance with claim 14, wherein said top end of said front wall, rear wall and first and second side walls is provided with a continuous, inwardly turning retaining flange.

23. The protective holder in accordance with claim 22, wherein a first corner is formed where said front wall meets said first side wall, and a second corner is formed where said front wall meets said second side wall, and wherein at each of said first and second corners, said inwardly turning retaining flange is extended to form an arc.

24. The protective holder in accordance with claim 23, wherein a third corner is formed where said rear wall meets said first side wall, and a fourth corner is formed where said rear wall meets said second side wall, and wherein at each of said third and fourth corners, said inwardly turning retaining flange is extended to form an arc.

25. The protective holder in accordance with claim 14, wherein said bottom member has an interior surface comprising a floor and wherein a plurality of support members are disposed on said floor, said support members being capable of raising an electronic device resting thereon above the surface of said floor.

26. The protective holder in accordance with claim 14, further comprising four corner walls, each of said corner walls having a thickness greater than the thickness of said first and second side walls.

* * * * *